(12) United States Patent
Judka et al.

(10) Patent No.: US 11,181,387 B2
(45) Date of Patent: Nov. 23, 2021

(54) DYNAMIC ROUTING SYSTEM

(71) Applicant: INTERNATIONAL BUSINESS MACHINES CORPORATION, Armonk, NY (US)

(72) Inventors: Danielle Judka, Mount Laurel, NJ (US); Philip Siconolfi, Wappingers Falls, NY (US); Weon W. Yuan, Hyde Park, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 296 days.

(21) Appl. No.: 16/143,838

(22) Filed: Sep. 27, 2018

(65) Prior Publication Data
US 2020/0103238 A1    Apr. 2, 2020

(51) Int. Cl.
*G01C 21/34* (2006.01)

(52) U.S. Cl.
CPC ....... *G01C 21/343* (2013.01); *G01C 21/3469* (2013.01); *G01C 21/3476* (2013.01); *G01C 21/3492* (2013.01)

(58) Field of Classification Search
CPC .............. G01C 21/343; G01C 21/3415; G01C 21/3476; G01C 21/3492; G01C 21/34; G01C 21/3461; G01C 21/3605; G01C 21/26; B60W 40/04
See application file for complete search history.

(56) References Cited

U.S. PATENT DOCUMENTS

| | | | |
|---|---|---|---|
| 7,202,801 B2 | 4/2007 | Chou | |
| 7,920,965 B1 * | 4/2011 | Nesbitt | G01C 21/00 |
| | | | 701/416 |
| 8,095,303 B1 * | 1/2012 | Nesbitt | G01C 21/3476 |
| | | | 340/988 |
| 9,404,760 B2 * | 8/2016 | Ulloa Paredes | G06Q 50/30 |
| 10,215,586 B2 * | 2/2019 | Khoe | G01C 21/3661 |
| 10,354,527 B2 * | 7/2019 | DiMeo | G01C 21/3617 |
| 2011/0144898 A1 * | 6/2011 | Konig | H04L 45/123 |
| | | | 701/532 |

(Continued)

FOREIGN PATENT DOCUMENTS

| | | |
|---|---|---|
| WO | 2007146818 A2 | 12/2007 |
| WO | 2016125184 A2 | 8/2016 |

OTHER PUBLICATIONS

Mell, Peter et al. "The NIST Definition of Cloud Computing—Recommendations of the National Institute of Standards and Technology" NIST Special Publication 800-145; Sep. 2011; 7 pgs.

*Primary Examiner* — Redhwan K Mawari
(74) *Attorney, Agent, or Firm* — Cantor Colburn LLP; Teddi Maranzano

(57) ABSTRACT

Methods, systems and computer program products for dynamic routing are provided. Aspects include receiving a plurality of stops from a user, wherein the plurality of stops includes at least one fixed location and at least one variable location and obtaining an address for at least one of the plurality of stops. Aspects also include obtaining a routing goal associated with the user and generating a route, including each of the plurality of stops, based on the routing goal. Aspects further include monitoring a movement of the user and updating the route based at least in part on the movement of the user.

13 Claims, 6 Drawing Sheets

(56) References Cited

U.S. PATENT DOCUMENTS

| | | | |
|---|---|---|---|
| 2013/0211938 A1* | 8/2013 | Allaqaband | G06Q 20/18 |
| | | | 705/21 |
| 2013/0304347 A1* | 11/2013 | Davidson | G08G 1/052 |
| | | | 701/99 |
| 2015/0120192 A1* | 4/2015 | Ron | G01C 21/3605 |
| | | | 701/539 |
| 2015/0168532 A1 | 6/2015 | Hampel et al. | |
| 2015/0253144 A1 | 9/2015 | Rau et al. | |
| 2016/0314482 A1* | 10/2016 | Basu | G06Q 30/0251 |
| 2017/0059342 A1 | 3/2017 | Rajendran et al. | |
| 2017/0109704 A1* | 4/2017 | Lettieri | G06Q 10/0833 |
| 2017/0138744 A1* | 5/2017 | Jaquinta | G01C 21/3484 |
| 2017/0262790 A1* | 9/2017 | Khasis | G08G 1/0116 |
| 2017/0284814 A1* | 10/2017 | Gaither | G01C 21/3676 |
| 2017/0336221 A1* | 11/2017 | Salowitz | G06Q 10/047 |
| 2018/0017406 A1* | 1/2018 | Semnani | G01C 21/3676 |
| 2018/0112995 A1* | 4/2018 | Bortolussi | G01C 21/3476 |
| 2018/0129276 A1* | 5/2018 | Nguyen | G09B 9/00 |
| 2018/0245937 A1* | 8/2018 | Moore | G01C 21/3453 |
| 2018/0268359 A1* | 9/2018 | Soubhagya | G08G 1/096741 |
| 2018/0299285 A1* | 10/2018 | Morita | G01C 21/3492 |
| 2019/0122148 A1* | 4/2019 | Akselrod | G06Q 10/047 |
| 2019/0212157 A1* | 7/2019 | Wu | H04W 4/40 |
| 2020/0103238 A1* | 4/2020 | Judka | G01C 21/3492 |

\* cited by examiner

DYNAMIC ROUTING SYSTEM

BACKGROUND

The invention relates generally to routing system and, more specifically, to dynamic routing systems.

Increasingly, global positioning systems (GPSs), handheld devices, and online map routing services provide mechanisms to navigate from one point to another by calculating paths based on information derived from roadway maps. These routing services typically have added features to automatically calculate the type of directions desired. For example, added features may allow an operator to specify routing objectives such as: shortest distance (using an algorithm to determine the shortest distance from one point to the next); least amount of travel time (using an algorithm to determine the shortest distance based on the road's speed limit and distance, and calculating the resulting driving time); least use of freeways; least use of energy (gasoline and/or electricity); and least use of toll roads.

Routing systems typically include cartographic maps and map databases to determine an appropriate driving route. The map databases represent a network of roads and often include information about toll roads, speed limits, highway exit points, and points of interest (POIs). The map databases also include points on a map represented in the form of latitudes and longitudes, universal transverse Mercator (UTM) coordinates, and/or geospatial coordinates. Some examples of final destinations and/or waypoints include POIs (e.g., museums, restaurants, railways, exit points, etc.), user-entered destinations, and fixed reference points along a route.

SUMMARY

According to an embodiment, a dynamic routing system is provided. The system includes a memory having computer readable computer instructions, and a processor for executing the computer readable instructions. The computer-readable instructions include instructions for receiving a plurality of stops from a user, wherein the plurality of stops includes at least one fixed location and at least one variable location and obtaining an address for at least one of the plurality of stops. The computer-readable instructions also include instructions for obtaining a routing goal associated with the user and generating a route, including each of the plurality of stops, based on the routing goal. The computer-readable instructions further include instructions for monitoring a movement of the user and updating the route based at least in part on the movement of the user.

According to another embodiment, a method for providing dynamic routing is provided. The method includes receiving a plurality of stops from a user, wherein the plurality of stops includes at least one fixed location and at least one variable location and obtaining an address for at least one of the plurality of stops. The method also includes obtaining a routing goal associated with the user and generating a route, including each of the plurality of stops, based on the routing goal. The method further includes monitoring a movement of the user and updating the route based at least in part on the movement of the user.

According to a further embodiment, a computer program product is provided. The computer program product includes a computer readable storage medium having program instructions embodied therewith. The program instructions are executable by a computer processor to cause the computer processor to perform a method. The method includes receiving a plurality of stops from a user, wherein the plurality of stops includes at least one fixed location and at least one variable location and obtaining an address for at least one of the plurality of stops. The method also includes obtaining a routing goal associated with the user and generating a route, including each of the plurality of stops, based on the routing goal. The method further includes monitoring a movement of the user and updating the route based at least in part on the movement of the user.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings, in which:

DETAILED DESCRIPTION

Figure 1:
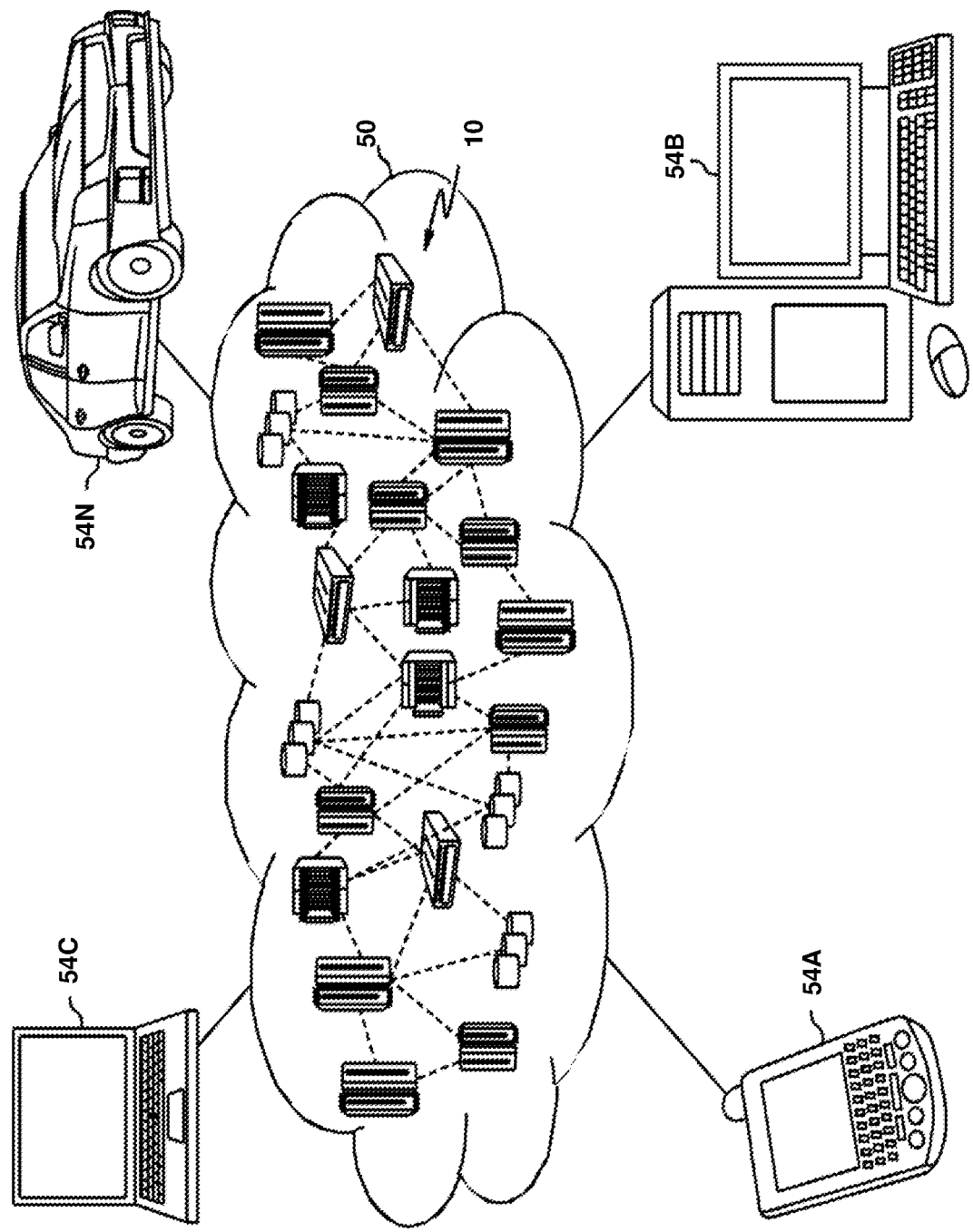
FIG. 1 depicts a cloud computing environment according to one or more embodiments of the present invention.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems; storage, deployed applications, and possibly limited control of select networking components (e.g., host firewalls).

Deployment Models are as follows:

Private cloud: the cloud infrastructure is operated solely for an organization. It may be managed by the organization or a third party and may exist, on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist, on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
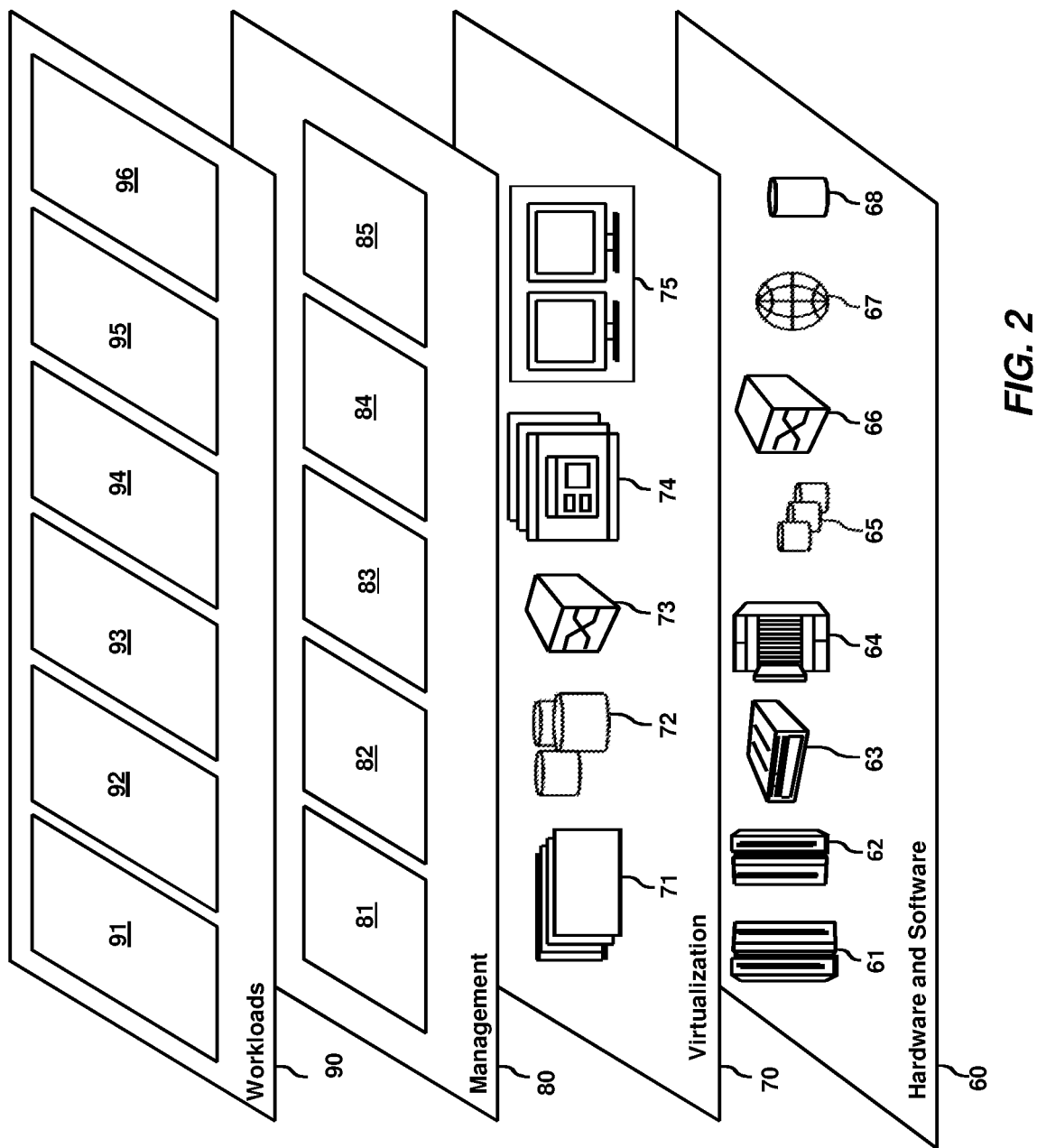
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and vehicle routing 96.

Figure 3:
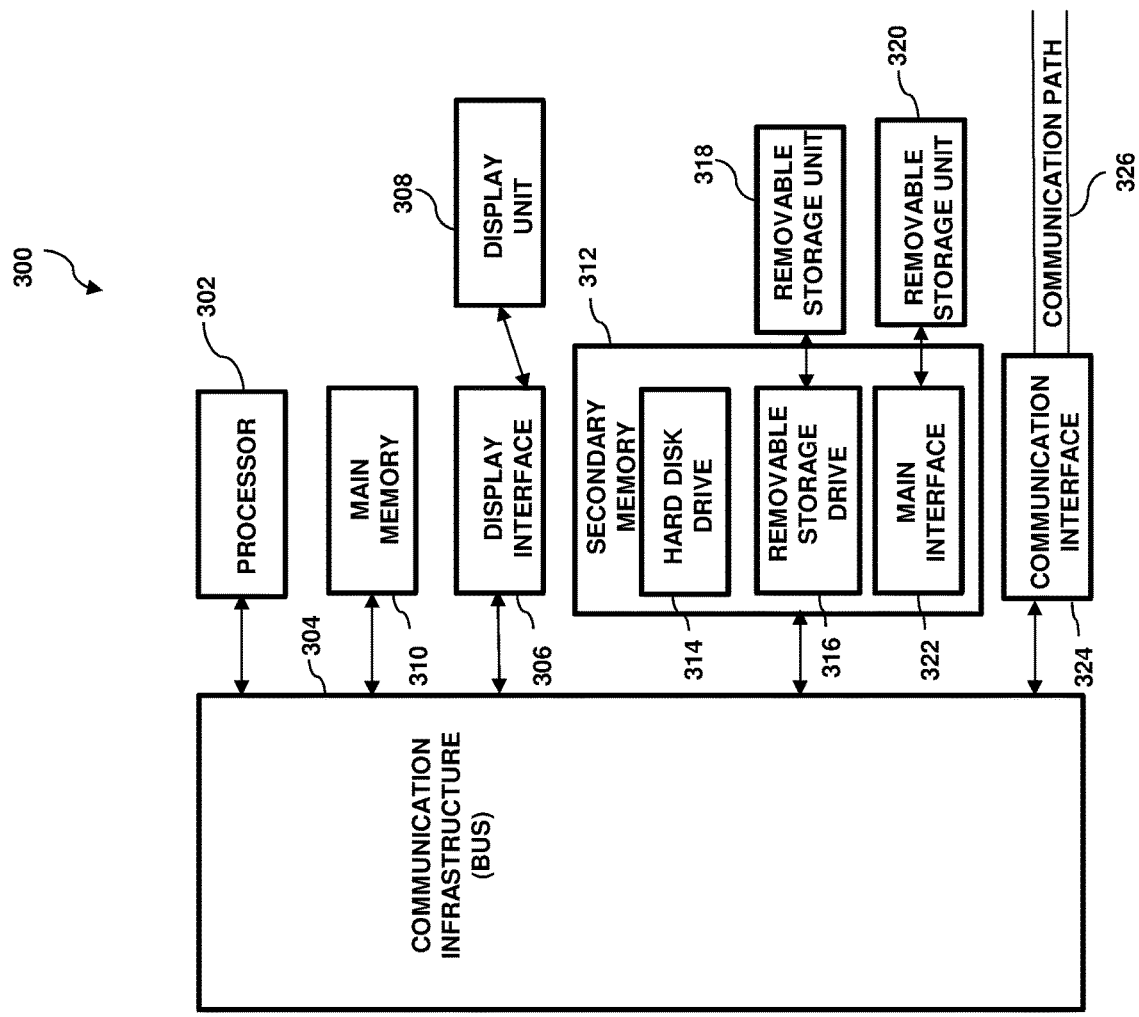
FIG. 3 depicts an exemplary computer system capable of implementing one or more embodiments of the present invention.

Turning now to a more detailed description of aspects of the present invention, FIG. 3 illustrates a high-level block diagram showing an example of a computer-based system 300 useful for implementing one or more embodiments of the invention. Although one exemplary computer system 300 is shown, computer system 300 includes a communication path 326, which connects computer system 300 to additional systems and may include one or more wide area networks (WANs) and/or local area networks (LANs) such as the internet, intranet(s), and/or wireless communication network(s). Computer system 300 and additional systems are in communication via communication path 326, (e.g., to communicate data between them).

Computer system 300 includes one or more processors, such as processor 302. Processor 302 is connected to a communication infrastructure 304 (e.g., a communications bus, cross-over bar, or network). Computer system 300 can include a display interface 306 that forwards graphics, text, and other data from communication infrastructure 304 (or from a frame buffer not shown) for display on a display unit 308. Computer system 300 also includes a main memory 310, preferably random access memory (RAM), and may also include a secondary memory 312. Secondary memory 312 may include, for example, a hard disk drive 314 and/or a removable storage drive 316, representing, for example, a floppy disk drive, a magnetic tape drive, or an optical disk drive. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by a removable storage drive 316. As will be appreciated, removable storage unit 318 includes a computer readable medium having stored therein computer software and/or data.

In some alternative embodiments of the invention, secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM or PROM) and associated socket, and other removable storage units 320 and interfaces 322 which allow software and data to be transferred from the removable storage unit 320 to computer system 300.

Computer system 300 may also include a communications interface 324. Communications interface 324 allows software and data to be transferred between the computer system and external devices. Examples of communications interface 324 may include a modem, a network interface (such as an Ethernet card), a communications port, or a PCM-CIA slot and card, etc. Software and data transferred via communications interface 324 are in the form of signals which may be, for example, electronic, electromagnetic, optical, or other signals capable of being received by communications interface 324. These signals are provided to communications interface 324 via communication path (i.e., channel) 326. Communication path 326 carries signals and may be implemented using wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 310 and secondary memory 312, removable storage drive 316, and a hard disk installed in hard disk drive 314. Computer programs (also called computer control logic) are stored in main memory 310, and/or secondary memory 312. Computer programs may also be received via communications interface 324. Such computer programs, when run, enable the computer system to perform the features of the present disclosure as discussed herein. In particular, the computer programs, when run, enable processor 302 to perform the features of the computer system. Accordingly, such computer programs represent controllers of the computer system.

Navigation systems offer useful directions to drivers who require assistance in locating a desired destination address in an area that is unfamiliar to them or for helping a user in selecting an optimal route to the desired destination address. As discussed above, vehicle routing systems typically allow a user to select a routing objective such as shortest distance; least amount of travel time; least use of freeways; and least use of toll roads. However, currently available routing systems are only configured to receive exact destinations from users.

In exemplary embodiments, a dynamic routing system is provided that is configured to receive a plurality of stops from a user, calculate a route including each of the plurality of stops and to dynamically update route based on detected user movement. The plurality of stops, include fixed stops that have an exact location and variable stops that can be a type of store and/or a brand of store. For example, the user can enter an address of a stop, the user can enter that they want to stop a grocery store and the user can enter that they want to stop a certain brand of drugstore. In addition, the user can enter a desired time of arrival at one or more stops, a desired time of arrival window for one or more stops, and/or a desired ordering of the stops. The dynamic routing system is also configured to monitor a movement of the user and traffic conditions along the route and to make updates to the route based on these factors.

Figure 4:
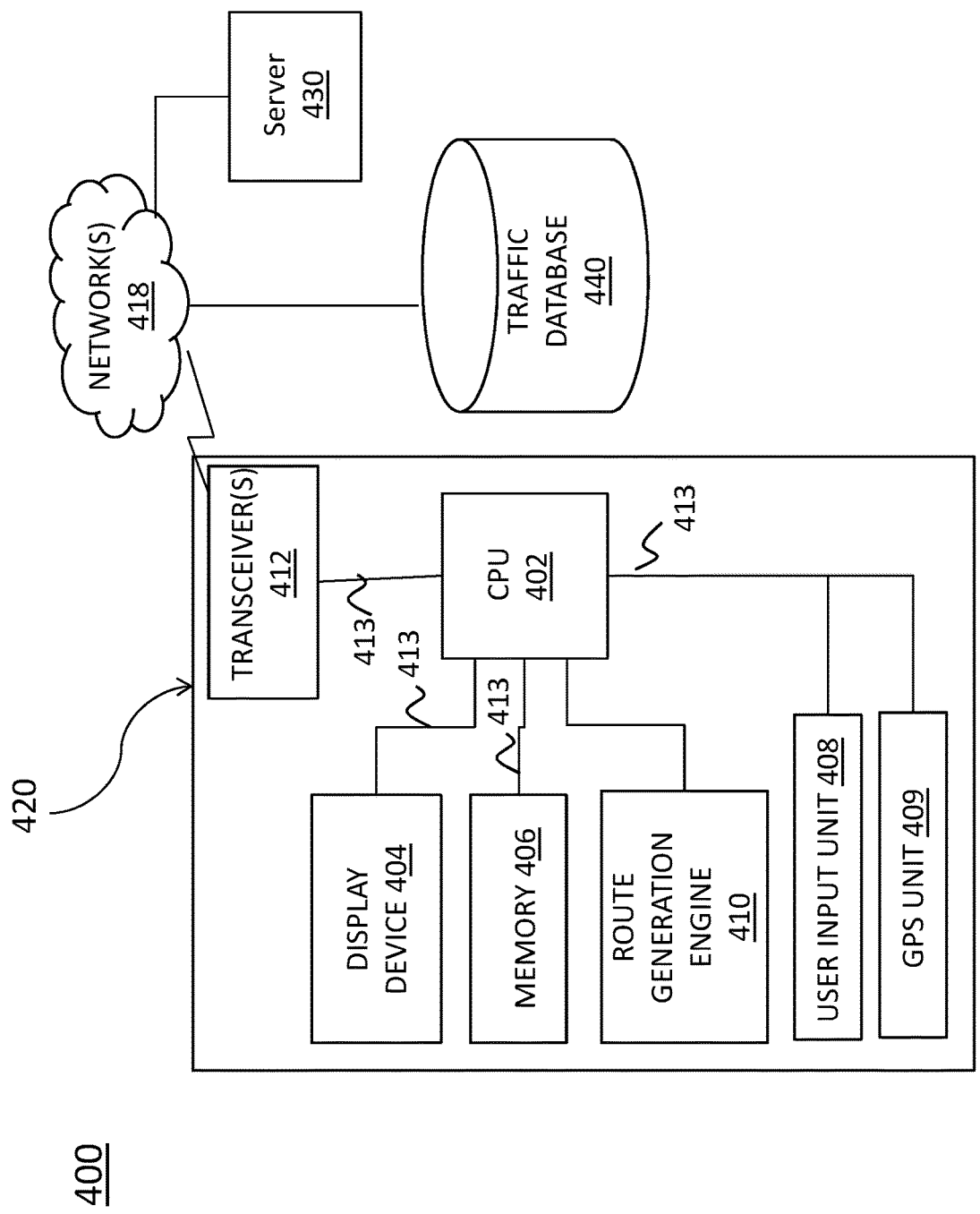
FIG. 4 depicts a system upon which vehicle routing and navigation processes may be implemented according to an embodiment of the invention.

Turning now to FIG. 4, a system 400 upon which the dynamic routing and navigation processes may be implemented will now be described in an embodiment. The system 400 shown in FIG. 4 includes components of a navigation system 420, which in turn includes a processor 402, a display device 404, a memory 406, a user input unit 408, a GPS unit 409, a route generation engine 410, and a transceiver 412. These components may be communicatively coupled via one or more communication buses 413, e.g., a data bus.

The navigation system 420 may be communicatively coupled to one or more communication networks 418 via, e.g., a wireless network interface. In an embodiment, the transceiver 412 is configured to receive signals from a global positioning system (GPS) unit 409 and to communicate with various other systems via the networks 418. The various other systems can include, but are not limited to, a server 430 and a traffic database 440.

The processor 402 is configured to receive inputs (e.g., the desired stops) from a user via the user input unit 408 and execute the route generation engine 410 as described herein. In an embodiment, the processor 402 may be integrated into a vehicle control module such as, for example, an infotainment control module or a navigation control module. In another embodiment, the processor is integrated to a mobile device, such as a smartphone or tablet.

The user input unit 408 may be implemented as a keypad or a keyboard for allowing a user to input information such as a destination address. In one embodiment, the user may also interact with the user input unit 408 through voice. In an embodiment, the display device 404 may be a liquid crystal display (LCD) screen that is used to display graphics and text. The display screen 404 displays routes generated by the route generation engine 410. Although FIG. 4 illustrates the user input unit 408 and the display device 404 as separate components, it is understood that the user input unit 408 and the display device 404 may be a combined unit. For example, in an embodiment the display device 404 is a touchscreen that detects the presence and location of a user's touch.

In an embodiment, the memory 406 stores a database of maps for generating routes. The memory 406 also stores previously generated routes that have been driven by a user of the vehicle as well as previous locations that the user has visited that are recognized by overlaying GPS data onto a map when the user did not use a generated route by the navigation system to reach said locations. The route generation engine 410 includes a mapping tool that takes as input a starting location (e.g., address), a plurality of stops, and optionally timing information for each of the stops and returns, as output, one or more routes to follow to get from the starting location to the destination location subject to routing objectives. The route generation engine 410 accesses a database of maps (e.g., stored in the memory 406 for generating the routes). The route generation engine 410 receives historical traffic conditions from the traffic database 440 and, if available, real-time traffic data from the server 430, and factors the expected conditions along various routes into determining the route to be provided to the user.

The transceiver 412 may be in communication with a satellite (not shown) for providing information regarding a current (or starting) location of the vehicle. Alternatively, the current (or starting) location of the vehicle is determined by obtaining user input. Specifically, the user may input current location information into a keypad, keyboard, or touchscreen of the user input unit 408. The networks 418 may be any type of known networks in the art. For example, the networks 418 may be a combination of public (e.g., Internet), private (e.g., local area network, wide area network, virtual private network), and may include wireless and wireline transmission systems (e.g., satellite, cellular network, terrestrial networks, etc.).

While the navigation system 420 is described as being integrated with a vehicle, e.g., in a vehicle control module such as, for example, an infotainment control module or a navigation control module, it will be understood that the navigation system 420 may be implemented by alternative means. For example, aspects of the navigation system 420 may be implemented on a personal digital device such as, but not limited to, a smartphone or tablet computer.

Each of the plurality of stops entered by the user are designated as either fixed points or variable points. A fixed point is a stop that has a fixed location, such as a child's school, a doctor's office, or the like. A variable point is a stop that does not have a fixed location, such stops can be entered as a type of store, a brand of store, a type of restaurant, etc. In addition, the user can input timing and/or order information for one or more of the stops entered. For example, the user can enter a desired time of arrival for a stop, a desired time window for a stop, a desired order for the stops, and/or a dependency of one or more of the stops (i.e., that one of the stops must be completed before another stop).

In exemplary embodiments, the CPU 402 is configured to analyze the input stop information received from the user input unit 408 and to identify candidate destinations and physical addresses for the destinations. The CPU 402 can communicate with the server 430 to identify candidate destinations and physical addresses based on the input provided by the user and the location of the user. For example, if a user enters "grocery store" as a stop, the CPU 402 can obtain a listing of the grocery stores near the current location of the user and near other stops entered by the user. As the location of the user changes throughout the day the system 400 can mark stops as complete based on determining that the user has visited one or more of the stops. In addition, the system 400 can dynamically update the route based on stops that have been completed, traffic information, and changes in the location of the user.

Figure 5:
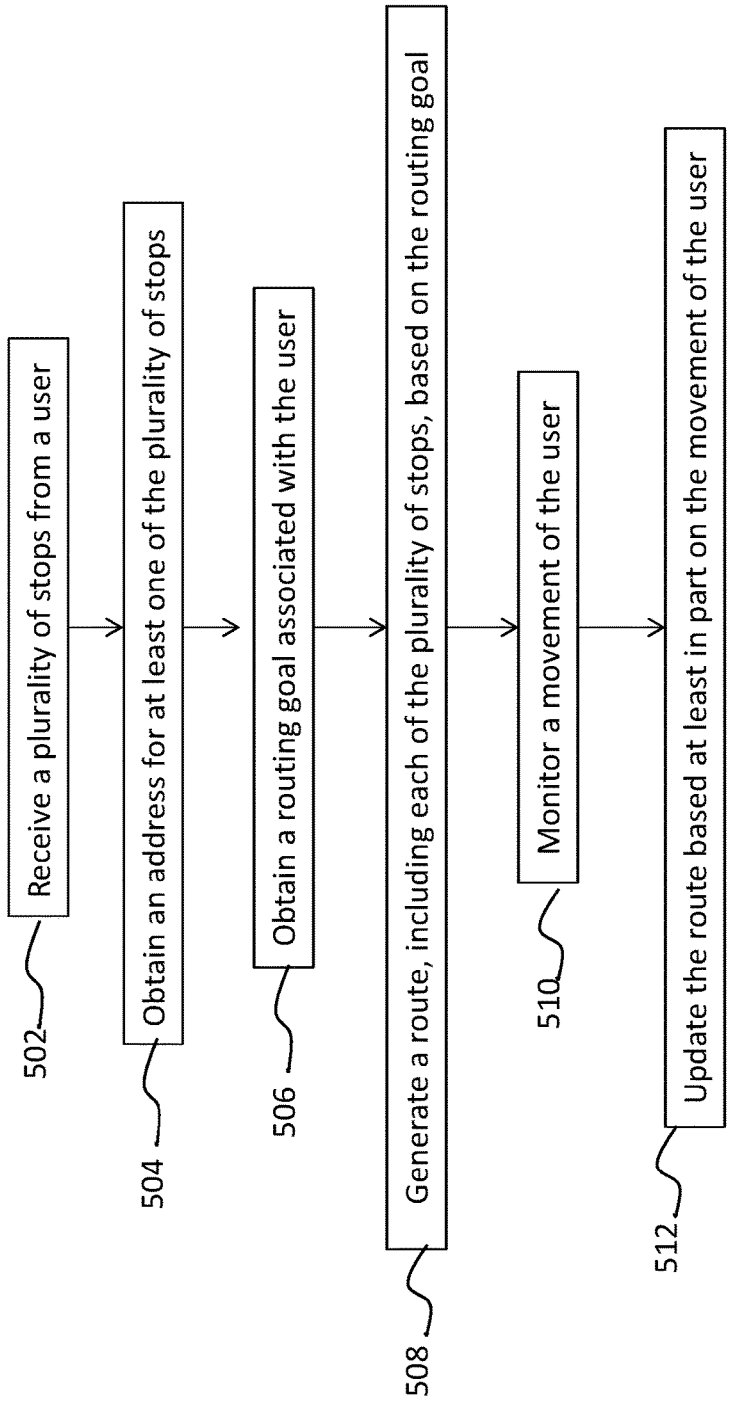
FIG. 5 depicts a flow diagram of a process for providing dynamic routing according to an embodiment of the invention.

Turning now to FIG. 5, a flow diagram of a method 500 for providing dynamic routing in accordance with an embodiment is shown. The method 500 begins at block 502 by receiving a plurality of stops from a user. The plurality of stops includes at least one fixed location and at least one variable location. In one embodiment, the at least one variable location includes at least one type of a store, such as a drugstore, grocery store, or the like. In another embodiment, the at least one variable location includes a brand of store, such as CVS™, WHOLE FOODS™, or the like. Next, as shown at block 504, the method 500 includes obtaining an address for at least one of the plurality of stops. The method 500 also includes obtaining a routing goal associated with the user, as shown at block 506. The routing goal is one of a minimization of a number of miles traveled, a minimization of an amount of time spent in traffic, a minimization of an amount of fuel consumed, and/or the minimization of an amount of mandatory fees, such as tolls or fares, accumulated in the route. The routing goal can be obtained from a stored user profile or based on user input.

Next, as shown at block 508, the method 500 includes generating a route, including each of the plurality of stops, based on the routing goal. The method 500 also includes monitoring a movement of the user, as shown at block 510. The movements of the user can be monitored to determine which of the plurality of stops have been completed and to determine changes in the physical location of the user. Next, as shown at block 512, the method 500 includes updating the route based at least in part on the movement of the user. The method 500 can also include monitoring a traffic condition along the route and updating the route based at least in part on the traffic condition.

In one embodiment, the route is updated based upon detecting that the user has completed one of the plurality of stops. For example, a user includes a stop at a grocery store in the plurality of stops and the route provided has the user stopping at a grocery store in the afternoon, if the user stops at a grocery store in the morning, the afternoon stop can be removed from the route. In this example, the system can ask the user if the afternoon stop should be removed from the route, or it could automatically remove the stop based on predetermined user preferences.

In one embodiment, at least one of the plurality of stops includes a desired time of arrival. For example, a user enters multiple stops including a doctor's appointment and a route is generated that has the doctor's office as the third stop. If the system detects that traffic conditions are worsening, the system is configured to update the route to move the doctor's appointment to be the second stop in order to ensure an on-time arrival. In exemplary embodiments, if no time of arrival or time window for arrival is provided by the user, the routing system can determine the hours of operation associated with the stop and can use the hours of operation as the time window for arrival.

In one embodiment, the plurality of stops further includes a preferred order of the plurality of stops. For example, after the user enters the stops the user can be presented with a list of the stops and prompted to select an order in which the user would prefer to complete them. In exemplary embodiments, the routing system can use the preferred order in determining the route.

In one embodiment, the plurality of stops further includes a dependency between two or more of the plurality of stops. For example, a user may wish to go grocery shopping and may need to go to the bank to get cash for their shopping trip. Accordingly, the stop at the bank needs to occur before the stop at the grocery store.

Figure 6:
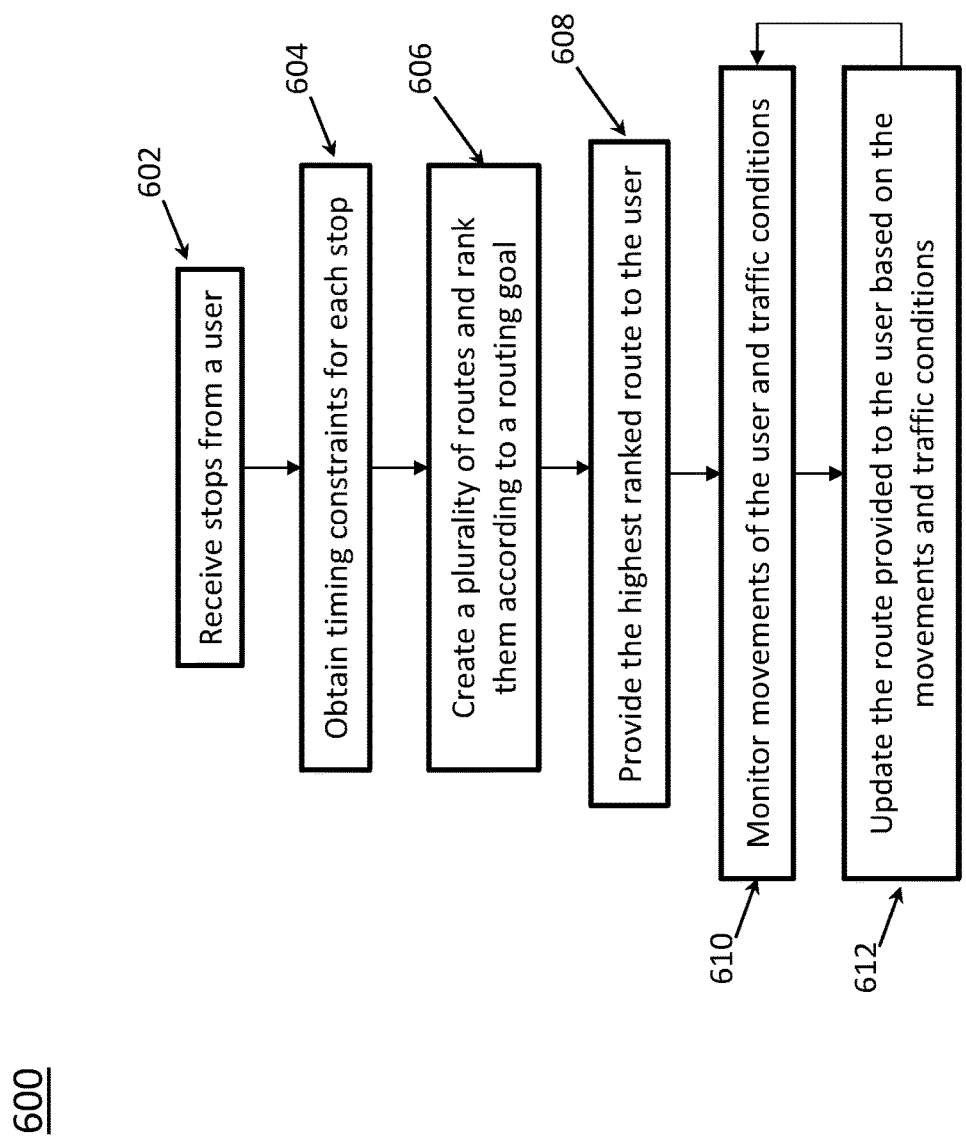
FIG. 6 depicts a flow diagram of a process for providing dynamic routing according to another embodiment of the invention.

Turning now to FIG. 6, a flow diagram of a method 600 for providing dynamic routing will now be described in accordance with an embodiment. As shown at block 602, the method 600 includes receiving stops from a user. Next, as shown at block 604, the method 600 also includes obtaining timing constraints for each stop. In one embodiment, the timing constraints are provided by the user and include a desired time or time window of arrival. In another embodiment, the timing constraints determined based on the hours of operation of a business associated with the stop. The method 600 also includes creating a plurality of routes and ranking them according to a routing goal, as shown at block 606. In one embodiment, the routing goal is one of a minimization of a number of miles traveled, a minimization of an amount of time spent in traffic, a minimization of an amount of fuel consumed, and/or the minimization of an amount of mandatory fees, such as tolls or fares, accumulated in the route. The routing goal can be obtained from a stored user profile or based on user input.

Next, as shown at block 608, the method 600 includes providing the highest ranked route to the user. In one embodiment, providing the highest ranked route to the user includes providing turn-by-turn navigational directions. The method 600 also includes monitoring movements of the user and traffic conditions. Next, as shown at block 612, the method 600 includes updating the route provided to the user based on the movements and traffic conditions.

In one embodiment, the places of establishment are associated by words that best describe the places and are kept in memory. Therefore, a machine learning, or artificial intelligence, model can be implemented to parse the necessary data gathered from the Internet. The model will find key terminologies that are not filler words and possible descriptors that represent a business. For example, in order for a business to be considered a grocery store, words like "produce", "fruits", "shopping" will be recognized by the model after parsing through the data.

Technical effects and benefits include creating and modifying a route having fixed and variable stops based on user movements and traffic conditions, thereby reducing the potential delays and increasing the efficiency of a user's journey.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for dynamic routing, comprising:
    receiving a plurality of stops from a user, wherein the plurality of stops includes at least one fixed location, at least one variable location, and a dependency between one or more of the plurality of stops and wherein at least one of the plurality of stops includes a desired time of arrival provided by the user;
    obtaining an address for at least one of the plurality of stops;
    obtaining a routing goal associated with the user;

generating a plurality of routes including each of the plurality of stops;
ranking the plurality of routes based on the routing goal, wherein the routing goal includes a minimization of an amount of fuel consumed;
providing, via a vehicle control module of an in-vehicle navigational system, a highest ranked route to the user by providing turn-by-turn navigational directions to the user;
monitoring a movement of the user to determine a stop of the plurality of stops has been completed;
monitoring a traffic condition along the highest ranked route; and
updating the highest ranked route based at least in part on the movement of the user and on the traffic condition, wherein updating the highest ranked route includes removing the stop of the plurality of stops has been completed and wherein updating the highest ranked route includes reordering the plurality of stops based on worsening traffic conditions to ensure arrival at the at least one of the plurality of stops before the desired time of arrival provided by the user,
wherein the dependency between one or more of the plurality of stops, received from the user, indicates that one of the plurality of stops must be completed before a second of the plurality of stops,
wherein each of the plurality of stops that does not have the desired time of arrival provided by the user includes a latest time of arrival that is obtained from operating hours of a business associated with the location.

2. The method of claim 1, wherein the at least one variable location includes at least one type of a store.

3. The method of claim 2, wherein the at least one variable location further includes a brand of store.

4. The method of claim 1, wherein the routing goal further comprises one of a minimization of a number of miles traveled, a minimization of an amount of time spent in traffic, a minimization of an amount of fuel consumed, and a minimization of an amount of mandatory fees.

5. The method of claim 1, wherein the plurality of stops further includes a preferred order of the plurality of stops.

6. A dynamic routing system, comprising: a memory having computer readable instructions; and a processor for executing the computer readable instructions, the computer readable instructions including instructions for: receiving a plurality of stops from a user, wherein the plurality of stops includes at least one fixed location, at least one variable location, and a dependency between one or more of the plurality of stops and wherein at least one of the plurality of stops includes a desired time of arrival provided by the user; simultaneously performing in parallel: obtaining an address for at least one of the plurality of stops; and obtaining a routing goal associated with the user; generating a plurality of routes—including each of the plurality of stops, based on the routing goal; ranking the plurality of routes based on the routing goal, wherein the routing goal includes a minimization of an amount of fuel consumed; providing, via a vehicle control module of an in-vehicle navigational system, a highest ranked route to the user by providing turn-by-turn navigational directions to the user; monitoring a movement of the user to determine a stop of the plurality of stops has been completed; monitoring a traffic condition along the highest ranked route; and updating the highest ranked route based at least in part on the movement of the user and on the traffic condition, wherein updating the highest ranked route includes removing the stop of the plurality of stops has been completed and wherein updating the highest ranked route includes reordering the plurality of stops based on worsening traffic conditions to ensure arrival at the at least one of the plurality of stops before the desired time of arrival provided by the user,
wherein the dependency between one or more of the plurality of stops, received from the user, indicates that one of the plurality of stops must be completed before a second of the plurality of stops,
wherein each of the plurality of stops that does not have the desired time of arrival provided by the user includes a latest time of arrival that is obtained from operating hours of a business associated with the location.

7. The dynamic routing system of claim 6, wherein the at least one variable location includes at least one type of a store.

8. The dynamic routing system of claim 7, wherein the at least one variable location further includes a brand of store.

9. The dynamic routing system of claim 6, wherein the routing goal is-further comprises one of a minimization of a number of miles traveled, and a minimization of an amount of time spent in traffic, and a minimization of an amount of fuel consumed.

10. The dynamic routing system of claim 6, wherein the plurality of stops further includes a preferred order of the plurality of stops.

11. A computer program product comprising a non-transitory computer readable storage medium having program instructions embodied therewith the program instructions executable by a computer processor to cause the computer processor to perform a method, comprising: receiving a plurality of stops from a user, wherein the plurality of stops includes at least one fixed location, at least one variable location, and a dependency between one or more of the plurality of stops and wherein at least one of the plurality of stops includes a desired time of arrival provided by the user; simultaneously performing in parallel, by the computer processor: obtaining an address for at least one of the plurality of stops; and obtaining a routing goal associated with the user; generating a plurality of routes, including each of the plurality of stops, based on the routing goal; ranking the plurality of routes based on the routing goal, wherein the routing goal includes a minimization of an amount of fuel consumed; providing, via a vehicle control module of an in-vehicle navigational system, a highest ranked route to the user by providing turn-by-turn navigational directions to the user; monitoring a movement of the user to determine a stop of the plurality of stops has been completed; monitoring a traffic condition along the highest ranked route; and updating the highest ranked route based at least in part on the movement of the user and upon the traffic condition, wherein updating the highest ranked route includes removing the stop of the plurality of stops has been completed and wherein updating the highest ranked route includes reordering the plurality of stops based on worsening traffic conditions to ensure arrival at the at least one of the plurality of stops before the desired time of arrival provided by the user,
wherein the dependency between one or more of the plurality of stops, received from the user, indicates that one of the plurality of stops must be completed before a second of the plurality of stops,
wherein each of the plurality of stops that does not have the desired time of arrival provided by the user includes a latest time of arrival that is obtained from operating hours of a business associated with the location.

12. The computer program product of claim 11, wherein the at least one variable location includes at least one type of a store.

13. The computer program product of claim 12, wherein the at least one variable location further includes a brand of store.

\* \* \* \* \*